US012195026B2

(12) United States Patent
Bigoness et al.

(10) Patent No.: US 12,195,026 B2
(45) Date of Patent: Jan. 14, 2025

(54) DRIVING AID SYSTEM

(71) Applicant: GENTEX CORPORATION, Zeeland, MI (US)

(72) Inventors: Eric P. Bigoness, Ada, MI (US); Nathan T. Overmyer, Caledonia, MI (US)

(73) Assignee: GENTEX CORPORATION, Zeeland, MI (US)

( * ) Notice: Subject to any disclaimer, the term of this patent is extended or adjusted under 35 U.S.C. 154(b) by 263 days.

(21) Appl. No.: 17/542,640

(22) Filed: Dec. 6, 2021

(65) Prior Publication Data

US 2022/0204013 A1 Jun. 30, 2022

Related U.S. Application Data

(60) Provisional application No. 63/132,874, filed on Dec. 31, 2020.

(51) Int. Cl.
| | |
|---|---|
| *B60W 50/14* | (2020.01) |
| *B60R 11/04* | (2006.01) |
| *G02B 27/00* | (2006.01) |
| *G02B 27/01* | (2006.01) |

(52) U.S. Cl.
CPC ............ *B60W 50/14* (2013.01); *B60R 11/04* (2013.01); *G02B 27/0093* (2013.01); *G02B 27/0101* (2013.01); *B60W 2050/143* (2013.01); *G02B 2027/0138* (2013.01)

(58) Field of Classification Search
CPC ........... B60W 50/14; B60W 2050/143; B60W 2050/146; B60R 11/04; G02B 27/0093; G02B 27/0101; G02B 2027/0138; B60Q 3/208; B60Q 9/008; G06F 3/012
USPC ........................................................ 701/70
See application file for complete search history.

(56) References Cited

U.S. PATENT DOCUMENTS

| | | | |
|---|---|---|---|
| 11,751,288 B2 * | 9/2023 | Park .................... | H05B 1/0236 |
| | | | 219/220 |
| 2008/0316011 A1 * | 12/2008 | Kirsch ................. | G02B 27/01 |
| | | | 340/439 |
| 2016/0152184 A1 * | 6/2016 | Ogawa .................. | G09G 5/373 |
| | | | 345/589 |
| 2016/0238840 A1 * | 8/2016 | Charle .................. | G02B 5/18 |
| 2018/0031831 A1 * | 2/2018 | Iwase ................. | G02B 27/0101 |
| 2019/0232869 A1 * | 8/2019 | Kruse .................... | B60Q 9/00 |
| 2019/0381937 A1 * | 12/2019 | Rakshit .................. | B60R 1/001 |
| 2020/0064640 A1 * | 2/2020 | Nagano ................. | G09G 3/001 |
| 2020/0160714 A1 * | 5/2020 | Inaba ................... | B60W 50/14 |
| 2020/0207358 A1 * | 7/2020 | Katz ................. | G01C 21/3697 |

* cited by examiner

*Primary Examiner* — Yi-Kai Wang
(74) *Attorney, Agent, or Firm* — Price Heneveld LLP; Brian James Brewer

(57) ABSTRACT

A system is disclosed that may selectively illuminate a first peripheral portion of a vehicle windshield from a plurality of peripheral portions. The first peripheral portion may correspond to part of a periphery of a first area portion of the windshield. The first area portion may be one of a plurality of area portions of the windshield. Further, the first area portion may be determined based on a substantial alignment with a driver's view of an object. Accordingly, a periphery portion of the windshield may be illuminated to draw the driver's attention to the object.

22 Claims, 2 Drawing Sheets ized on ambient lighting conditions. In yet other embodiments, a color of the emitted light may be based, at least in part, on an identity or categorization of the object requiring the driver's attention. In yet other embodiments, the light assembly may comprise a light diffuser operable to increase the homogenization of light transmitted therethrough an onto the first peripheral portion.

DRIVING AID SYSTEM

CROSS-REFERENCE TO RELATED APPLICATIONS

This application claims priority under 35 U.S.C. § 119(e) to U.S. Provisional Application No. 63/132,874 filed on Dec. 31, 2020, entitled "DRIVING AID SYSTEM," the disclosure of which is hereby incorporated by reference in its entirety.

FIELD OF INVENTION

The present invention relates in general to driving aid systems and relates, more particularly, to driving aid systems that augment a driver's reality.

BACKGROUND OF INVENTION

Vehicle drivers are faced with many objects vying for their attention while driving down the road. Specifically, there are innumerable objects outside of the vehicle that the driver must pay attention to, such as other vehicles, animals, cyclists, pedestrians, road signs, traffic lights, lane lines, etc. Accordingly, a driver may easily miss a critical object or detail, such as a small child darting into the road in front of them. Such an oversight may have severe consequences. Accordingly, there is a need for improved driving aid systems to ensure a driver is made aware of objects requiring their attention.

SUMMARY

In accordance with the present disclosure, the problems associated with a driver being unaware of objects requiring their attention have been substantially reduced or eliminated.

In accordance with one aspect of the present disclosure, a system is disclosed. The system may comprise: at least one first sensor, at least one second sensor, a controller, and/or a light assembly. A first sensor may be operable to monitor an exterior of a vehicle and collect first sensor data. A second sensor may be operable to monitor an interior of the vehicle and collect second sensor data. The controller may be operable to: receive first and second sensor data, identify the presence of an object, determine a driver's head or eye position, and identify a first peripheral portion of a windshield. The first sensor data may be received from the at least one first sensor. The second sensor data may be received from the at least one second sensor. The presence of the object may be identified based, at least in part, on the first sensor data. The driver's head or eye position may be determined based, at least in part, on the second sensor data. The first peripheral portion may be identified as corresponding to part of periphery of a first area portion of the windshield. The first area portion may be substantially aligned with the driver's view of the object. The determination of the first area portion aligning with the driver's view of the object may be based, at least in part, on the driver's head or eye position. The light assembly may be disposed in the vehicle. In some embodiments, the light assembly may be disposed such that it is not directly visible by the driver or by an individual standing in front of the vehicle. Accordingly, the light assembly may be disposed in a recess of the vehicle's dashboard. Further, the light assembly may be operable to selectively illuminate a plurality of peripheral portions of the windshield and to selectively illuminate the first peripheral portion based, at least in part, on the identification of the first peripheral portion. The plurality of peripheral portion may include peripheral portions along the top, bottom, or side of the windshield. Additionally, in some embodiments, the illumination may be operable to flash. In other embodiments, the intensity of the illumination may be changed based, at least in part, on ambient lighting conditions. In yet other embodiments, a color of the emitted light may be based, at least in part, on an identity or categorization of the object requiring the driver's attention. In yet other embodiments, the light assembly may comprise a light diffuser operable to increase the homogenization of light transmitted therethrough an onto the first peripheral portion.

In some embodiments, the controller may be further operable to identify the object. The object may be identified based, at least in part, on the first sensor data. Additionally, the controller may be further yet operable to determine whether the object requires the driver's attention. Whether the object requires the driver's attention may be determined based on the object's identity being present in a list of objects. In some further embodiments, the list of object identities requiring the driver's attention may be operable to change. A list of object identities requiring the drivers attention may be, for example, a traffic light, a lane line, stopped vehicle, or a pedestrian. Further, it may be changed based, at least in part on the vehicle's location, the vehicle's speed, the environment of a road over which the vehicle is traveling, or the type of roadway over with the vehicle is traveling.

In some embodiments, the system may further comprise a speaker. The speaker may be operable to emit an audible sound. The sound may be emitted based, at least in part, on the controller's determination of the presence of the object requiring the driver's attention. In some further embodiments, the sound may be operably emitted only when the controller determines the driver has not paid attention to the object requiring the driver's attention.

In some embodiments, the system may further comprise a wireless communications module operable to establish a wireless communicative connection with one or more device and receive communication data. In some embodiments, the one or more device may be the object. Further, the wireless communications module may be communicatively connected to the controller. Accordingly, in some embodiments, the presence of the object, the identification of the object, and/or the identification of the first peripheral portion may be based, at least in part, on the communication data.

In accordance with another aspect of the present disclosure, a system is disclosed. The system may comprise: at least one sensor, a wireless communications module, a controller, and/or a light assembly. A sensor may be operable to monitor an interior of a vehicle and collect sensor data. The wireless communications module may be operable to establish a wireless communicative connection with one or more device and receive communication data. The controller may be operable to: determine the presence of an object, receive the sensor data, determine a driver's head or eye position, and identify a first peripheral portion of a windshield. The presence of the object may be determined based, at least in part, on the communication data. The driver's head position or eye position may be determined based, at least in part, on the sensor data. The first peripheral portion of the windshield may be identified as corresponding to part of a periphery of a first area portion of the windshield. The first area portion substantially aligned with the driver's view of the object based, at least in part, on the one of the driver's head position and eye position. Additionally, in some embodiments, the one or more device may be the object. The light assembly may be disposed in the vehicle. Additionally, the light assembly may be operable to selectively illuminate a plurality of peripheral portions of the windshield and to selectively illuminate the first peripheral portion based, at least in part, on the identification of the first peripheral portion. The plurality of peripheral portions may include peripheral portions along a top and/or a bottom of the windshield. In some embodiments, the size of the first peripheral portion may be operably changed relative a proximity of the vehicle to the object requiring the driver's attention. In other embodiments, the illumination may flash. In some embodiments, the intensity of the illumination may be operably changed based, at least in part, on ambient lighting conditions. In some embodiments, the light assembly may not be directly visible by an individual standing in front of the vehicle. In some embodiments, the light assembly comprises a light diffuser operable to increase the homogenization of light transmitted therethrough and onto the first peripheral portion.

In some embodiments, the controller is further operable to determine whether the object requires the driver's attention. The determination may be based, at least in part, on the object's identity being present on a list. In some further embodiments, the list of object identities requiring the driver's attention is operable to change based, at least in part, on the vehicle's location, the vehicle's speed, the environment of a road over which the vehicle is traveling, and/or the type of roadway over which the vehicle is traveling.

Additionally, in some embodiments, the system may further comprise a speaker. The speaker may be operable to emit an audible sound. The audible sound may be emitted based, at least in part, on a determination by the controller that the driver has not paid attention to the object requiring his attention.

Additionally, in some embodiments, the color of the emitted light may change. The color of the emitted light may change or be selected based, at least in part, on an identity or categorization of the object.

In some embodiments, the light assembly may not be directly visible by an individual standing in front of the vehicle. Additionally or alternatively, the light assembly may not be directly visible by the driver. In such embodiments, the light assembly may be disposed in a recess of the vehicle's dashboard.

In some embodiments, the system may further comprise a second sensor. The second sensor may be operable to monitor an exterior of the vehicle and collect second sensor data. In such an embodiment, the presence of the object, the first peripheral portion, and/or the identification of the object may be identified based, at least in part on, the second sensor data.

Some embodiments of these systems may have the advantage of ensuring the driver is made aware of objects requiring their attention. Not only may a driver's attention be grabbed, but it may be focused in the direction of the object, increasing the driver's awareness. Specifically, focusing the driver's attention in the direction of the object may be enabled by selectively illuminating the first peripheral portion of the windshield. Accordingly, the illumination may take advantage of the driver's saccadic eye movements to visually pull the driver's attention toward the object and decrease the driver's reaction time.

Additionally, some embodiments may have the additional advantage of further ensuring the driver's attention is focused on the objects requiring their attention by flashing, increasing the intensity of, or increasing the size of the illumination of the windshield. Additionally or alternatively, the driver's attention may be further ensured though the emission of an audible sound by the speaker assembly. Such additional measures may be taken if it is determined that the driver has not yet paid attention to the object and/or previous the windshield illumination went un-noticed. Accordingly, measures taken by the system are less likely to go un-noticed or ignored by the driver. Therefore, the object is more likely to be noticed by the driver in a timely fashion.

Additionally, some embodiments where the light assembly is disposed in a recess of the dashboard or the dashboard comprises a protruding member, the system may have the additional advantage of the light assembly not being seen by others outside the vehicle. For example, other drivers or pedestrians in front of the vehicle may not see the light assembly. Such a configuration may be advantageous, because the lights my otherwise be distracting or confused with emergency vehicle lights by these individuals.

Further, some embodiments may have the further advantage of the intensity of illumination by the light assembly being based, at least in part, on ambient lighting conditions. Such an embodiment may be advantageous because as lighting conditions are brighter, illumination of the windshield may otherwise be increasingly difficult to see. Conversely, as lighting conditions are darker, illumination of the windshield may otherwise be too bright and be distracting to the driver or make visibility through the windshield difficult.

These and other aspects, objects, and features of the present disclosure will be understood and appreciated by those skilled in the art upon studying the following specification, claims, and appended drawings. Further, features of each embodiment disclosed herein may be used in conjunction with, or as a replacement for, features in other embodiments.

DETAILED DESCRIPTION

The specific systems, devices, and processes illustrated in the attached drawings and described in this disclosure are simply exemplary embodiments of the inventive concepts defined in the appended claims. Hence, specific characteristics relating to the embodiments disclosed herein are not limiting, unless the claims expressly state otherwise.

Some embodiments of the present disclosure are directed to driving aid systems for ensuring a driver is made aware of objects requiring their attention by illuminating a vehicle windshield. Accordingly, some embodiments may address the problems associated with a driver being unaware of objects requiring their attention.

Figure 1:
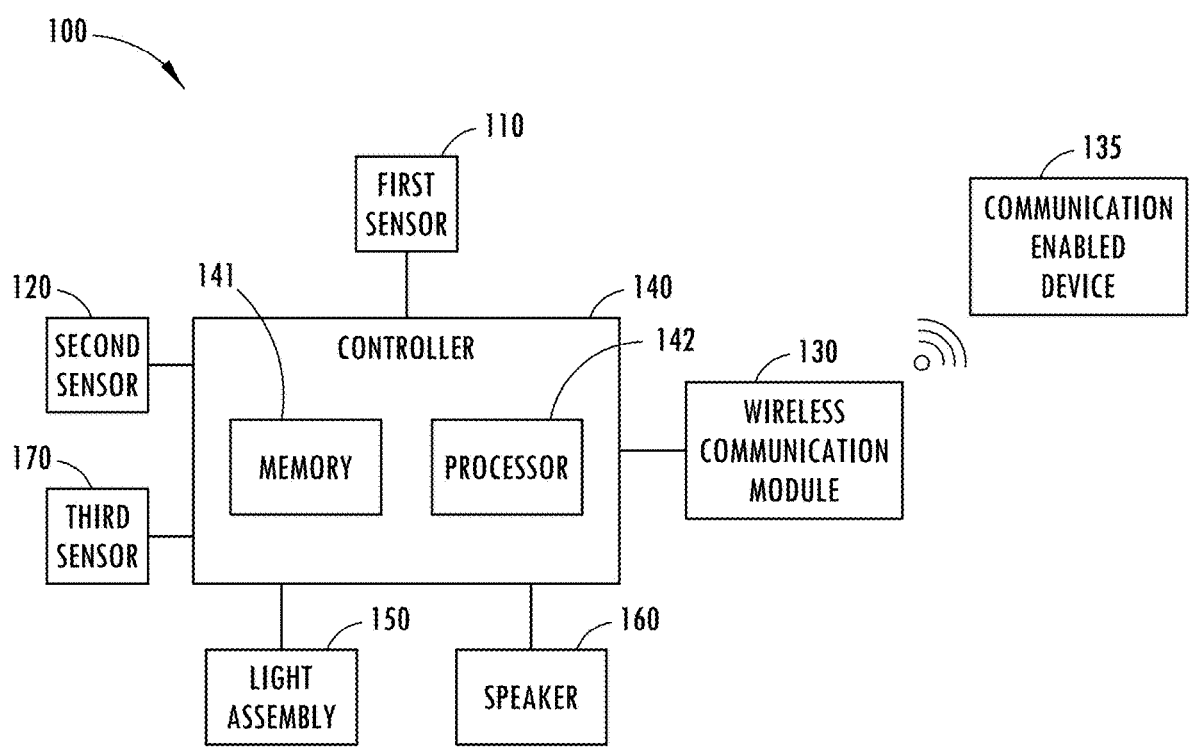
FIG. 1: Schematic representation of an embodiment of a driving aid system.
Figure 2:
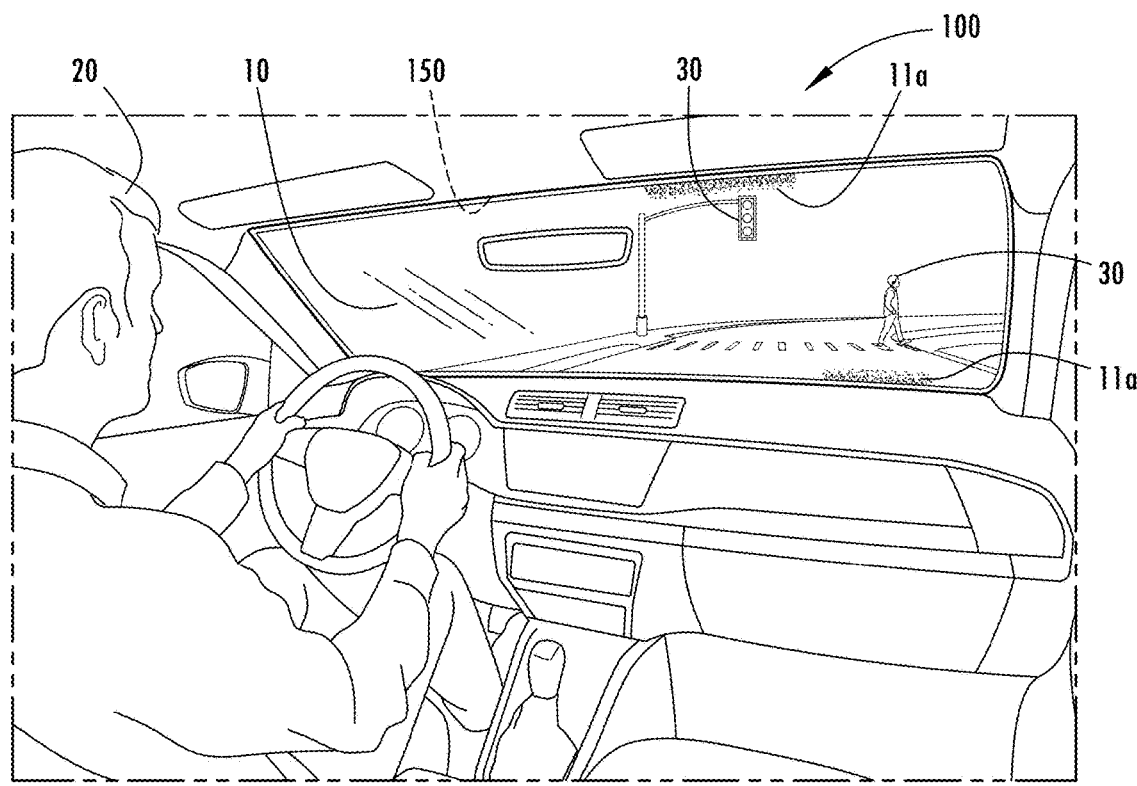
FIG. 2: Perspective view of a vehicle equipped with a driving aid system.
Figure 3:
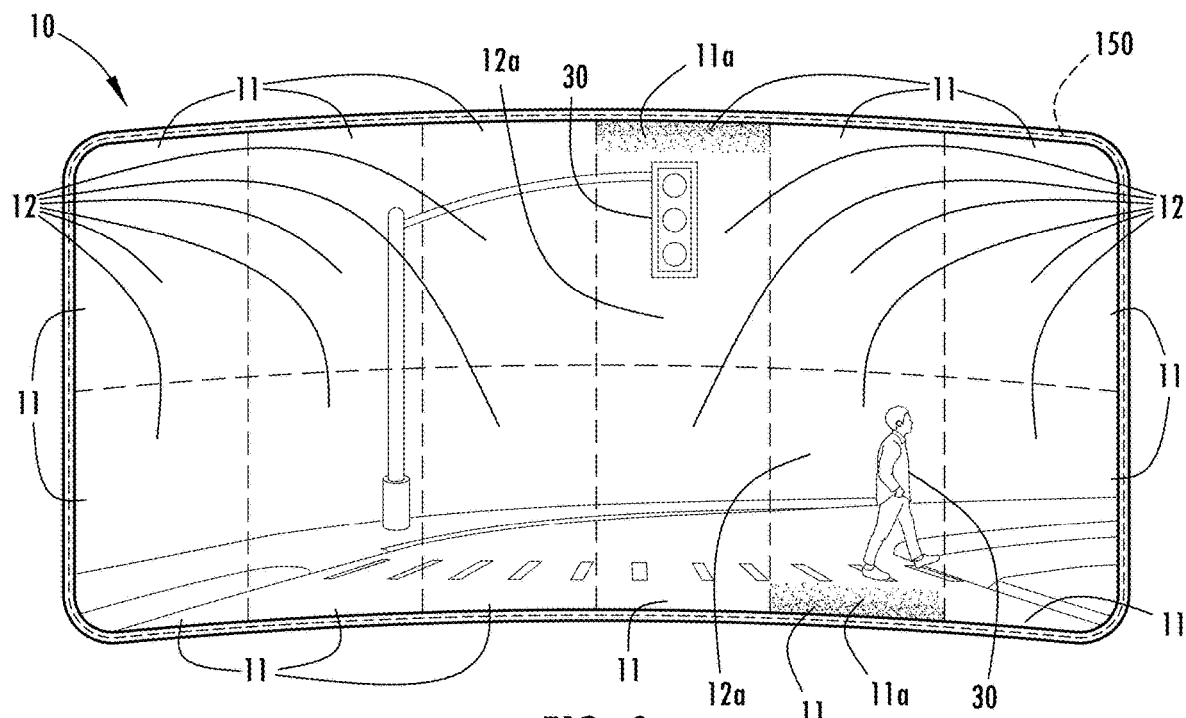
FIG. 3: Schematic representation of a windshield illuminated by a driving aid system.

In FIGS. 1-3, aspects of a driving aid system 100 are shown. FIG. 1 is a schematic representation of driving aid system 100. Additionally, FIG. 2 is a perspective view of a vehicle having driving aid system 100. Further, FIG. 3 is a schematic representation of a windshield 10 selectively illuminated by driving aid system 100. Driving aid system 100 may comprise one or more first sensor 110, one or more second sensor 120, a wireless communications module 130, a controller 140, and/or a light assembly 150. Further, driving aid system 100 may be operable to selectively illuminate a windshield 10 of a vehicle to draw a driver's 20 attention to an object 30. Object 30, for example, may be a vehicle, animal, cyclist, pedestrian, road sign, traffic light, lane line, etc.

First sensor 110 may be a device operable to monitor an exterior of the vehicle and collect first sensor data. Accordingly, first sensor 110 may have a field of view corresponding to a scene exterior the vehicle. The scene may be forward relative normal operation of the vehicle. In some embodiments, first sensor 110 may be an imager, such as a camera. In other embodiments, first sensor 110 may be a distance detector, such as a radar detector, photoelectric sensor, lidar detector, or an ultrasonic sensor. Accordingly, first sensor 110 may be operable to determine a distance between first sensor 110 and an object 30. This distance may be approximated as a distance between the vehicle or driver 20 and object 30. Further, in some embodiments, a direction between first sensor 110 and object 30 may similarly be determined by first sensor 110. Similarly, a direction between first sensor 110 and driver 20 may be determined. Additionally, first sensor 110 may be disposed at a number of locations, such as at a rearview assembly of the vehicle.

Similarly, second sensor 120 may be a device operable to monitor an interior of the vehicle and collect second sensor data. Accordingly, second sensor 120 may have a field of view corresponding to an interior of the vehicle. Specifically, the field of view may substantially include or be focused on an area of the interior that would be occupied by driver 20 during normal operation of the vehicle. Further, second sensor 120 may have a field of view of the driver's 20 eyes. In some embodiments, second sensor 120 may be an imager, such as a camera.

Wireless communications module 130 may be a device operable to establish a wireless, communicative connection with one or more communication enabled device 135 to receive communication data. The communication enabled device 135 may be, for example, a second vehicle; infrastructure, such as a traffic light; or any other suitable device. In some embodiments, the communication enabled device 135 may be object 30. Accordingly, the wireless, communicative connection may be a vehicle to vehicle (V2V) or a vehicle to infrastructure (V2I) communication. Such communications may be enabled by Wi-Fi, cellular, Bluetooth, infra-red, radio, or other wireless communication technologies.

Controller 140 may comprise a memory 141 and a processor 142. Memory 141 may store one or more algorithms operable to perform one or more of the tasks of controller 140. Processor 142 may be operable to execute the one or more algorithms. Additionally, controller 140 may be communicatively connected to first sensor 110 and/or wireless communications module 130. In embodiments where controller 140 is communicatively connected to first sensor 110, controller 140 may be operable to receive the first sensor data from first sensor 110. Further, controller 140 may be operable to identify the presence and/or relative location of an object 30 based, at least in part, on the first sensor data. In embodiments where controller 140 is communicatively connected to wireless communications module 130, controller 140 may be operable to receive the communication data from wireless communications module 130. Accordingly, controller 140 may be operable to determine the presence and/or relative location of an object 30 based, at least in part, on the communication data. In the forgoing embodiments, controller 140, for example, may be operable to identify object 30. The identify may be one of a list of identities, such as: another vehicle, an animal, a cyclist, a pedestrian, a road sign, a traffic light, a lane line, etc. Further, the identity, for example, may be determined based, at least in part, on an image recognition operation of an image contained in the first sensor data or on an object identity contained in the communication data.

Additionally, controller 140 may be communicatively connected to second sensor 120. Accordingly, controller 140 may be operable to receive the second sensor data from second sensor 120. Therefore, controller 140 may be further operable to determine the driver's 20 head and/or eye position based, at least in part, on the second sensor data.

Furthermore, controller 140 may be operable to identify a first peripheral portion 11*a* of windshield 10. First peripheral portion 11*a* may be one of a plurality of peripheral portions 11 of windshield 10. Windshield 10 may comprise any number of peripheral portions 11. The plurality of peripheral portions 11 may include edge portions along the bottom, top, right side, and/or left side of the windshield 10 according to the driver's 20 perspective during normal vehicle operation. Further, first peripheral portion 11*a* may correspond to a periphery of a first area portion 12*a* and/or a periphery of windshield 10. Windshield 10 may comprise any number of area portions 12. First area portion 12*a* may be one of a plurality of area portions 12 of windshield 10. Further, first area portion 12*a* may be identified as to substantially align with the driver's 20 view of object 30 based, at least in part, on the driver's 20 head and/or eye position.

Additionally, in some embodiments, first area portion 12*a* may be further identified as substantially aligning with the driver's 20 view of object 30 based, at least in part, on a direction and/or location determination of object 30. Accordingly, controller 140 may be operable to determine a direction and/or a location of object 30 relative driver 20. The direction and/or location may be determined based, at least in part, on the first sensor data and/or the communication data. For example, controller 140 may determine the direction based, at least in part, on a direction measurement contained in the first sensor data; on an orientation, a location, or an identity of first sensor 110; and/or by analyzing an image from the first sensor data and inferring a direction. In other examples, controller 140 may determine the direction based, at least in part, a received location of object 30 contained in the communication data and comparing the received location relative a location of driver 20, windshield 10, and/or the vehicle.

Additionally, in some embodiments, the size of the identified first peripheral portion 11*a* may be determined based, at least in part, on the determination of the proximity of object 30. Similarly, in some embodiments, first area portion 12*a* may be identified as substantially aligning with the driver's 20 view of object 30 based, at least in part, on a proximity determination of object 30. Accordingly, controller 140 may be operable to determine a proximity of the object 30. The proximity of object 30 may be determined based, at least in part, on the first sensor data and/or the communication data. For example, controller 140 may determine the proximity based, at least in part, on a distance measurement contained in the first sensor data and/or by analyzing an image from the first sensor data and inferring a distance. In other examples, controller 140 may determine the proximity based, at least in part, a received location of object 30 contained in the communication data and comparing the received location relative a location of driver 20, windshield 10, and/or the vehicle. Therefore, in some embodiments, the size of the first peripheral portion 11*a* may be changed relative a proximity of the vehicle to the object 30 requiring the driver's attention. Further, the size of the first peripheral portion 11a and the distance to the object 30 may be inversely related. For example, the size of first peripheral portion 11a may be increased as the distance between the vehicle and the object 30 decreases, or vice versa.

Additionally or alternatively, controller 140 may be operable to determine if object 30 requires the driver's 20 attention. The determination as to whether object 30 requires the driver's 20 attention may be based, at least in part, on the object's 30 identity. For example, controller 140 may be operable to identify object 30 from a list of possible, relevant, and identifiable objects 30. The list may further be a list of objects 30 requiring the deriver's 20 attention. Accordingly, controller 140 may be operable to identify objects 30 requiring the deriver's 20 attention based, at least in part, on the first sensor data and/or the communication data. In some further embodiments, the list of object 30 identities requiring the driver's 20 attention may change. In some yet further embodiments, the list of object 30 identities requiring the driver's attention 20 may be based, at least in part, on the vehicle's location, the vehicle's speed, the environment of the road over which the vehicle is traveling, and/or the type of roadway over which the vehicle is traveling. For example, while driver 20 is known or determined to be driving on an expressway, the list of objects 30 whose presence may be determined as requiring the driver's 20 attention, for example, may be limited to other vehicles, animals, and lane lines. Conversely, while driver 20 is known or determined to be driving on a city road, the list of objects 30 whose presence may be determined as requiring the driver's 20 attention may be, for example, limited to cyclists, pedestrians, and traffic lights.

In some embodiments, one or more of the vehicle's location, the vehicle's speed, the environment of the road over which the vehicle is traveling, and/or the type of roadway over which the vehicle is traveling may be received by controller 140 via a communicative connection to the vehicle's CAN or LIN bus of the vehicle, a GPS, digital map, and/or a remote server. In other embodiments, one or more of the vehicle's location, the vehicle's speed, the environment of the road over which the vehicle is traveling, and/or the type of roadway over which the vehicle is traveling may be determined by controller 140 through analysis of the first sensor data. For example, controller 140 may be operable to determine the type of roadway or the type of surrounding environment by analyzing images from the first sensor data.

Light assembly 150 may be any assembly operable to emit light. The emitted light may be in the visible region of the electromagnetic spectrum. Therefore, light assembly 150 may comprise one or more light sources. A light source, for example, may be one or more light emitting diode ("LED"), halogen, quartz, incandescent, or compact fluorescent ("CFL") light bulb. Additionally, light assembly 150 may be disposed such that the emitted light impinges, at least part of, an interior surface of windshield 10. Further, light assembly 150 may be operable to independently illuminate a plurality of peripheral portions 11. Accordingly, one or more of the peripheral portions 11 may be selectively illuminated. Therefore, one or more first peripheral portion 11a may be selectively illuminated. In some instances, since first peripheral portion is substantially located at an edge of first area portion 12a, which is in alignment with object 30, the illumination may be substantially proximate the driver's 20 view of object 30 without illuminating directly in the visual path, which may otherwise obscure the driver's 20 view. The first peripheral portion 11a may be selectively illuminated based, at least in part, on the controller's 140 identification thereof. Further, in some embodiments, a color of the emitted light may correspond to an identity or categorization of object 30. Accordingly, a plurality of different first peripheral portions 11a may be selectively illuminated, each in a different color. In some embodiments, light assembly 150 may further comprise a light diffuser. The light diffuser may be operable to increase the homogenization of light transmitted therethrough. Further, the light diffuser may be disposed between the one or more light sources and windshield 10. Therefore, light may transmit through the light diffuser and impinge windshield 10 at one or more of the peripheral portions 11.

In some embodiments, light assembly 150 may be disposed on a dashboard of the vehicle or in a recess of the dashboard of the vehicle. In some embodiments where light assembly 150 is disposed on the dashboard, the dashboard may comprise one or more protruding member. The protruding member may be operable to occlude the driver's 20 direct view and/or a pedestrian standing in front of the vehicle's direct view of light assembly 150, under normal operating conditions. Thus, in some embodiments, light assembly 150 may be disposed such that it is not directly visible by driver 20 when driver 20 is positioned in the vehicle in accordance with normal operating conditions. Despite the lack of direct visibility of light assembly 150 by driver 20, driver 20 may still perceive illumination of first peripheral portion 11a. Additionally, light assembly 150 may likewise be disposed such that it is not directly, substantially visible by a pedestrian standing in front of the vehicle and/or other drivers driving their respective vehicles, under normal operating conditions.

In some embodiments where controller 140 is operable to determine a proximity of the object 30, the illumination of the identified first peripheral portion 11a may be flashed after the distance between the vehicle and the object 30 falls below a threshold distance. In such an embodiment, the frequency of the flashing may be changed based, at least in part, on the proximity of the vehicle to the object 30. Further, the frequency of the flashing and the distance to the object 30 may similarly be inversely related. For example, the frequency of the flashing may be increased as the distance between the vehicle and the object 30 decreases, or vice versa. Additionally or alternatively, the illumination intensity of the identified first peripheral portion 11a may be changed based, at least in part, on the proximity of the vehicle to the object 30. Further, the intensity of the illumination and the distance to the object 30 my similarly be inversely related. For example, the illumination intensity may be increased as the distance between the vehicle and the object 30 decreases, or vice versa.

In some embodiments where controller 140 is operable to determine a direction of object 30, the illumination of the identified first peripheral portion 11a may be changed based, at least in part, on the direction of object 30. For example, the intensity of the illumination may be increased as object 30 is in an increasingly forward direction relative the vehicle, and vice versa. In other words, the intensity of the illumination may be increased as the angular offset of object 30 from a central axis of the vehicle is decreased, and vice versa. Accordingly, the more off to the side object 30 is, the dimmer the illumination may be. In other examples, illumination of first peripheral portion 11a may only be activated if object 30 is within a directional threshold range. Accordingly, illumination of first peripheral portion 11a may only occur when object 30 is within a given angular range in front of the vehicle. The angular range, for example, may be less than or equal to 45, 30, 15, 10, or 15 degrees from center relative a forward direction of the vehicle.

In some embodiments, driving aid system 100 may further comprise a speaker assembly 160. Speaker assembly 160 may be operable to emit an audible sound based, at least in part, on the determination of the presence of the object 30 requiring the driver's 20 attention. In some further embodiments, the audible sound may be operably emitted further based, at least in part, on a determination that driver 20 has not paid attention to the object 30 requiring their attention. In such an embodiment, the emission of the audible sound may even be limited to instances where the determination that driver 20 has not paid attention to the object 30 requiring their attention is made. The determination that driver 20 has not paid attention to the object 30 requiring their attention may be based, at least in part, on analyzing second sensor data and determining that driver 20 has not looked in the direction of object 30 or not looked in the direction of object 30 for over a threshold period of time. The threshold period of time, for example, may be 0.5 or 1.0 seconds. Additionally or alternatively, the audible sound may be emitted from a plurality of locations. In such an embodiment, the sound may be emitted from speaker assembly 160 in a direction relative driver 20 based, at least in part, on a direction of object 30 relative driver 20. Accordingly, the sound may be emitted in the direction of object 30 relative driver 20. Therefore, the emitted sound may be further operable to direct the driver's 20 attention toward object 30.

In some embodiments, driving aid system 100 may further comprise a third sensor 170. Third sensor 170 may be a light sensor, such as a camera or an ambient light sensor (ALS). Accordingly, third sensor 170 may be operable to collect third sensor data related to lighting conditions. In such an embodiment, controller 140 may be operable to receive the third sensor data. Further, based, at least in part, on the third sensor data, controller 140 may be further operable to determine an ambient lighting condition. Additionally, based, at least in part, on the determined ambient lighting condition, the illumination intensity of light assembly 150 may in likewise be determined. For example, the illumination intensity of light assembly 150 may be reduced based, at least in part, on low ambient lighting conditions, or vice versa. In some embodiments, third sensor 170 may be disposed in a rearview assembly of the vehicle. Further, third sensor 170 may be directed forward, relative normal operating conditions of the vehicle, to determine lighting conditions forward the vehicle.

Some embodiments of driving aid system 100 of the present disclosure may have the advantage of ensuring driver 20 is made aware of objects 30 requiring their attention. Not only may a driver's 20 attention be grabbed, but it may be focused in the direction of object 30, increasing the driver's awareness. Specifically, focusing the driver's 20 attention in the direction of object 30 may be enabled by selectively illuminating first peripheral portion 11a of windshield 10. Accordingly, the illumination may take advantage of the driver's 20 saccadic eye movements to visually pull the driver's 20 attention toward object 30 and decrease the reaction time of driver 20.

Additionally, some embodiments may have the additional advantage of further ensuring the driver's 20 attention is focused on objects 30 requiring their attention by flashing, increasing the intensity of, or increasing the size of the illumination of windshield 10. Additionally or alternatively, the driver's attention may be further ensured though the emission of an audible sound by speaker assembly 160. Such additional measures may be taken if it is determined that driver 20 has not yet paid attention to object 30 and/or previous windshield 10 illumination went un-noticed. Accordingly, measures taken by driving aid system 100 are less likely to go un-noticed or ignored by driver 20. Therefore, object 30 is more likely to be noticed by driver 20 in a timely fashion.

Additionally, some embodiments where light assembly 150 is disposed in a recess of the dashboard or the dashboard comprises a protruding member, driving aid system 100 may have the additional advantage of light assembly 150 not being seen by others outside the vehicle. For example, other drivers or pedestrians in front of the vehicle may not see light assembly 150. Such a configuration may be advantageous, because the lights my otherwise be distracting or confused with emergency vehicle lights by these individuals.

Further, some embodiments may have the further advantage of the intensity of illumination by light assembly 150 being based, at least in part, on ambient lighting conditions. Such an embodiment may be advantageous because as lighting conditions are brighter, illumination of windshield 10 may otherwise be increasingly difficult to see. Conversely, as lighting conditions are darker, illumination of windshield 10 may otherwise be too bright and be distracting to driver 20 or make visibility through windshield 10 difficult.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
   at least one first sensor operable to monitor an exterior of a vehicle and collect first sensor data;
   at least one second sensor operable to monitor an interior of the vehicle and collect second sensor data;
   a controller operable to:

receive first sensor data from the at least one first sensor,
identify the presence of an object based, at least in part, on the first sensor data,
identify the direction of the object relative to the vehicle based, at least in part, on the first sensor data,
identify the distance of the object relative to the vehicle based, at least in part, on the first sensor data,
receive second sensor data from the at least one second sensor,
determine at least one of a driver's head position and eye position based, at least in part, on the second sensor data, and
identify a first peripheral portion of a windshield, the first peripheral portion corresponding to part of a periphery of a first area portion of the windshield, the first area portion substantially aligned with the driver's view of the object based, at least in part, on the one of the driver's head position and eye position, and based on the direction of the object relative to the vehicle; and
a light assembly disposed in the vehicle, the light assembly operable to selectively illuminate a plurality of peripheral portions of the windshield and to selectively illuminate the first peripheral portion based, at least in part, on the identification of the first peripheral portion, wherein the plurality of peripheral portions includes at least a right edge and a left edge of the windshield,
wherein the controller is further operable to control the light assembly to illuminate the first peripheral portion to create a first appearance at the first peripheral portion, and to control the light assembly to change the appearance from the first appearance as a function of the distance of the object relative to the vehicle.

2. The system of claim 1, wherein the controller is further operable to identify the object based, at least in part, on the first sensor data, and determine the object requires the driver's attention.

3. A system comprising:
at least one first sensor operable to monitor an exterior of a vehicle and collect first sensor data;
at least one second sensor operable to monitor an interior of the vehicle and collect second sensor data;
a controller operable to:
receive first sensor data from the at least one first sensor,
identify the presence of an object based, at least in part, on the first sensor data,
identify the direction of the object relative to the vehicle based, at least in part, on the first sensor data,
identify the distance of the object relative to the vehicle based, at least in part, on the first sensor data,
receive second sensor data from the at least one second sensor,
determine at least one of a driver's head position and eye position based, at least in part, on the second sensor data, and
identify a first peripheral portion of a windshield, the first peripheral portion corresponding to part of a periphery of a first area portion of the windshield, the first area portion substantially aligned with the driver's view of the object based, at least in part, on the one of the driver's head position and eye position, and based on the direction of the object relative to the vehicle; and
a light assembly disposed in the vehicle, the light assembly operable to selectively illuminate a plurality of peripheral portions of the windshield and to selectively illuminate the first peripheral portion based, at least in part, on the identification of the first peripheral portion,
wherein the controller is further operable to control the light assembly to illuminate the first peripheral portion to create a first appearance at the first peripheral portion, and to control the light assembly to change the appearance from the first appearance as a function of the distance of the object relative to the vehicle,
wherein the controller is further operable to identify the object based, at least in part, on the first sensor data, and determine the object requires the driver's attention, and
wherein a list of object identities requiring the driver's attention is operable to change based, at least in part, on at least one of the vehicle's location, the vehicle's speed, the environment of a road over which the vehicle is traveling, and the type of roadway over which the vehicle is traveling.

4. The system of claim 1, further comprising a speaker operable to emit an audible sound based, at least in part, on the controller's determination of the presence of the object requiring the driver's attention.

5. The system of claim 1, wherein the appearance of the first peripheral portion is changed by changing the size of the first peripheral portion as a function of the distance of the vehicle to the object requiring the driver's attention.

6. The system of claim 1, wherein the object requiring the driver's attention is at least one of traffic light, a lane line, and a pedestrian.

7. The system of claim 1, wherein the light assembly is not directly visible by the driver.

8. The system of claim 1, wherein a color of the emitted light is based, at least in part, on an identity or categorization of the object requiring the driver's attention.

9. The system of claim 1, further comprising:
a wireless communications module operable to establish a wireless communicative connection with one or more device and receive communication data;
wherein the presence of the object is identified further based, at least in part, on the communication data.

10. The system of claim 9, wherein the one or more device is the object.

11. A system comprising:
at least one sensor operable to monitor an interior of a vehicle and collect sensor data;
a wireless communications module operable to establish a wireless communicative connection with one or more device associated with an object and receive communication data;
a controller operable to:
determine the presence of the object based, at least in part, on the communication data received from the device associated with the object,
receive the sensor data from the at least one sensor,
determine at least one of a driver's head position and eye position based, at least in part, on the sensor data, and
identify a first peripheral portion of a windshield, the first peripheral portion corresponding to part of a periphery of a first area portion of the windshield, the first area portion substantially aligned with the driver's view of the object based, at least in part, on the one of the driver's head position and eye position;
a light assembly disposed in the vehicle, the light assembly operable to selectively illuminate a plurality of peripheral portions of the windshield and to selectively illuminate the first peripheral portion based, at least in part, on the identification of the first peripheral portion, wherein the plurality of peripheral portions includes at least a top edge and a bottom edge of the windshield.

12. The system of claim 11, wherein the location of the object is included in the communication data.

13. The system of claim 11, wherein the controller is further operable to determine the object requires the driver's attention.

14. The system of claim 11, wherein a list of object identities requiring the driver's attention is operable to change based, at least in part, on at least one of the vehicle's location, the vehicle's speed, the environment of a road over which the vehicle is traveling, and the type of roadway over which the vehicle is traveling.

15. The system of claim 11, further comprising a speaker operable to emit an audible sound based, at least in part, on the controller's determination of the presence of the object requiring the driver's attention.

16. The system of claim 11, wherein the size of the first peripheral portion is operably changed relative to a distance from the vehicle to the object requiring the driver's attention.

17. The system of claim 11, wherein the object requiring the driver's attention is at least one of a traffic light, a lane line, and a pedestrian.

18. The system of claim 11, wherein the first peripheral portion corresponds to a portion of the top edge of the windshield.

19. The system of claim 11, wherein a color of the emitted light is based, at least in part, on an identity or categorization of the object requiring the driver's attention.

20. The system of claim 11, further comprising:
a second sensor operable to monitor an exterior of the vehicle and collect second sensor data;
wherein the presence of the object is identified further based, at least in part, on the second sensor data.

21. The system of claim 11, wherein the plurality of peripheral portions includes the entire perimeter of the windshield.

22. The system of claim 1, wherein the plurality of peripheral portions includes the entire perimeter of the windshield.

* * * * *